Patented Mar. 22, 1938

2,111,890

UNITED STATES PATENT OFFICE 2,111,890

MONO-AZODYESTUFFS INSOLUBLE IN WATER

Ernst Fischer, Offenbach-on-the-Main, Germany, assignor to General Aniline Works, Inc., New York, N. Y., a corporation of Delaware No Drawing. Application September 21, 1936, Serial No. 101,887. In Germany September 21, 1935

5 Claims. (Cl. 260—95)

The present invention relates to mono-azodyestuffs insoluble in water; more particularly it relates to dyestuffs of the following general formula:

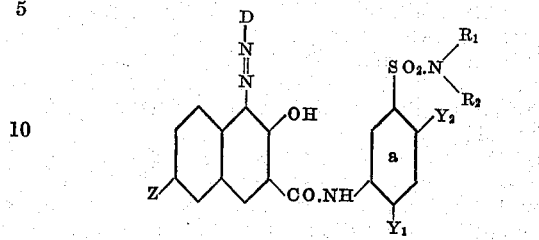

wherein the benzene radical $a$ is substituted in at least one of the two positions $Y_1$ and $Y_2$ by a member of the group consisting of alkyl, alkoxy, phenoxy and halogen, $R_1$ and $R_2$ stand for members of the group consisting of hydrogen, alkyl, aryl, benzyl and hydroaromatic radicals and the diazo radical D stands for compounds of the following formula:

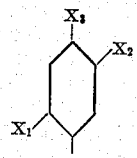

wherein $X_1$ stands for a member of the group consisting of hydrogen, alkyl, alkoxy and halogen, $X_2$ and $X_3$ stand for members of the group consisting of hydrogen, alkyl, alkoxy, halogen and the group —NH.CO.$R_3$, $R_3$ being a member of the group consisting of alkyl, benzyl, a radical of the benzene and naphthalene series and a hydroaromatic radical, always one of the three substituents $X_1$, $X_2$ and $X_3$ being an alkoxy group and always one of the two substituents $X_2$ and $X_3$ being the group —NH.CO.$R_3$, wherein Z stands for a member of the group consisting of hydrogen, halogen and alkoxy, Z being alkoxy in case $X_2$ stands for the group —NH.CO.$R_3$ and one of the substituents $X_1$ and $X_3$ for a member of the group consisting of hydrogen and halogen.

I have found that valuable violet to blue monoazodyestuffs are obtainable by combining the diazo-compounds from amines of the general formula:

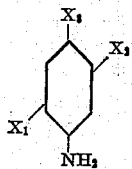

wherein $X_1$ stands for hydrogen, alkyl, alkoxy or halogen, $X_2$ and $X_3$ stand for hydrogen, alkyl, alkoxy, halogen or the group —NH.CO.$R_3$, $R_3$ being alkyl, aryl, aralkyl or a hydroaromatic radical, always one of the three substituents $X_1$, $X_2$ and $X_3$ being an alkoxy group and always one of the two substituents $X_2$ and $X_3$ being the group —NH.CO.$R_3$, with arylides of 2-hydroxynaphthalene-3-carboxylic acid of the following general formula:

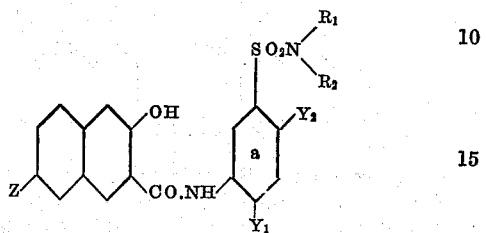

wherein the benzene radical $a$ contains substituents in at least one of the two positions $Y_1$ and $Y_2$, such as alkyl, alkoxy, aryloxy groups or halogen, $R_1$ and $R_2$ stand for hydrogen, alkyl, aryl, aralkyl or hydroaromatic radicals and Z stands for hydrogen, halogen or alkoxy, Z being alkoxy in case $X_2$ stands for the group —NH.CO.$R_3$ and simultaneously $X_1$ or $X_3$ represent hydrogen or halogen, only such dyestuff components being used as do not contain any group imparting solubility, such as the sulfonic or carboxylic acid group.

The dyestuffs can be produced in known manner on the fiber (native or regenerated cellulose), in substance or on a substratum. They may advantageously be used for the manufacture of very fast color lakes and for coloring cellulose esters and ethers, natural and artificial resins, high molecular, organic plastic masses as, for instance, products made from nitro-cellulose, resins prepared from formaldehyde and urea, phenols or amines, vinyl resins, natural rubber and the synthetic products which have a constitution and properties similar to those of natural rubber. The rubber dyeings thus obtained are of great technical value, since the new dyestuffs are insoluble in benzine, fast to vulcanization, very fast to light and do not bleed into white rubber during the vulcanization process. Especially with regard to the non-bleeding the present dyestuffs are distinctly superior to the comparable combinations which are proposed for coloring plastic masses by German Patent No. 601,254.

The dyestuffs from naphthols in the

group of which $R_1$ and $R_2$ represent alkyl, aryl, aralkyl or hydroaromatic radicals are much more adapted for the production of dyeings on the fiber (native and regenerated cellulose) than those wherein R₁ or R₂ or both stand for hydrogen.

The following examples serve to illustrate the invention, but they are not intended to limit it thereto:

(1) The goods which are impregnated with 6 grams per liter of the 2.3-hydroxynaphthoyl-1'-amino-4'-methylbenzene-5'-sulfodiethylamide are developed in known manner with a neutralized diazo bath from 3 grams of 1-amino-2.5-diethoxy-4-benzoylaminobenzene per liter, rinsed and soaped. A reddish blue of good fastness properties is obtained. The dyestuff corresponds with the following formula:

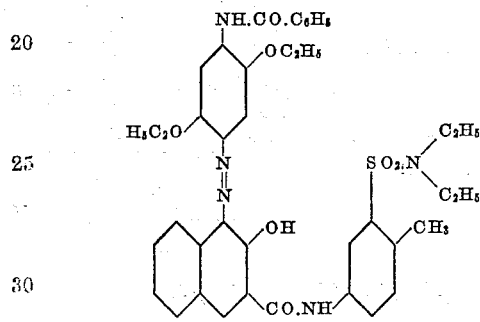

By working in the same manner and using 2.3-hydroxynaphthoyl-1'-amino-2'-methylbenzene-5'-sulfodimethylamide as coupling component, a violet of similar properties is obtained.

(2) 15 grams of 1-amino-2.5-diethoxy-4-benzoylaminobenzene are diazotized in the usual manner. Thereupon the diazo solution is mixed with sodium acetate in order to bind the excess of hydrochloric acid and then stirred into a solution of 19.2 grams of 2.3-hydroxynaphthoyl-1'-amino-4'-methylbenzene-5'-sulfoethylamide in dilute caustic soda solution. The separated dyestuff is filtered with suction, washed well and dried. It forms a blue violet powder. The lakes prepared therefrom in known manner possess good fastness properties.

The combination may also be effected in the presence of a substratum adapted for the preparation of color lakes.

(3) A pigment dye which is adapted for coloring rubber products is prepared as described in Example 2. 4 percent. of this dyestuff are incorporated with a suitable mixture of rubber, loading materials, sulfur and a vulcanization accelerator and the mixture is vulcanized in a vulcanization press for about 12 minutes at a steam pressure of 3 atmospheres above atmospheric pressure. There is obtained a blue violet vulcanizate which has a good fastness to light and neither bleeds into white rubber, nor gives rise to that phenomenon which is known as blushing or efflorescence when the rubber articles are stored.

(4) 13.6 grams of 1-amino-2.5-dimethoxy-4-benzoylaminobenzene are diazotized in the usual manner. The diazo solution which has been neutralized by means of sodium acetate until neutral to Congo paper is stirred into a solution of 21.4 grams of 2.3-hydroxynaphthoyl-1'-amino-2'-methoxybenzene-5'-sulfodiethylamide in dilute caustic soda solution. The blue dyestuff obtained is filtered with suction, washed well and dried. There is obtained a rubber product of a reddish blue shade which is fast to vulcanization and possesses very good fastness properties, when the mixture of rubber, the usual admixtures and 4 per cent. of the dyestuff is immersed into a solution of sulfur chloride in benzine and vulcanized in the cold.

(5) 23 grams of 2.3-hydroxynaphthoyl-1'-amino-2'-methylbenzene-5'-sulfo-N-methylbenzylamide are dissolved in water and the necessary quantity of caustic soda solution and reprecipitated with acetic acid, while well stirring. Into this suspension there is introduced, while stirring, a diazo solution prepared in the usual manner from 15 grams of 1-amino-2.5-diethoxy-4-benzoylaminobenzene while simultaneously adding such a quantity of sodium acetate as is necessary for binding the excess of mineral acid. When the combination is finished, the blue dyestuff is filtered with suction, washed well and dried. It may be used for coloring casein artificial horn in the following manner:

A mixture is prepared from 200 grams of rennet casein, 8 grams of zinc white and 1 gram of the dyestuff and hardened by treating it with formaldehyde. A greenish blue colored horn-like mass is obtained which possesses very good fastness properties.

The following table illustrates a series of other dyestuffs which may be prepared according to the present invention and are especially adapted for coloring high-molecular organic plastic masses:

Dyestuff from—

| | Diazo compound of— | Coupled with— | Shade |
|---|---|---|---|
| | | 2.3-hydroxynaphthoyl-1'-amino- | |
| 1 | 1-amino-2.5-diethoxy-4-benzoylaminobenzene | 2'-methylbenzene-5'-sulfodiethylamide | Reddish blue. |
| 2 | do | 2'-methoxybenzene-5'-sulfodiethylamide | Blue. |
| 3 | do | 2'-ethoxybenzene-5'-sulfodimethylamide | Violet. |
| 4 | do | 2'-phenoxybenzene-5'-sulfodiethylamide | Reddish blue. |
| 5 | do | 2'-chlorobenzene-5'-sulfodiethylamide | Do. |
| 6 | do | 2'-methylbenzene-5'-sulfamide | Blue. |
| 7 | do | 2'-methylbenzene-5'-sulfo-n-butylamide | Blue violet. |
| 8 | do | 2'-methylbenzene-5-sulfo-isobutylamide | Violet. |
| 9 | do | 2'-methylbenzene-5'-sulfobenzylamide | Blue. |
| 10 | do | 2'-methylbenzene-5'-sulfocyclohexylamide | Do. |
| 11 | do | 2'-methylbenzene-5'-sulfoanilide | Do. |
| 12 | do | 2'-methylbenzene-5'-sulfo-N-methyl-cyclohexylamide | Do. |
| 13 | do | 2'-methoxybenzene-5'-sulfo-N-methylanilide | Do. |
| 14 | do | 2'-methylbenzene-5'-sulfodibenzylamide | Do. |
| 15 | do | 2'-methylbenzene-5'-sulfo-N-benzyl-cyclohexylamide | Do. |
| 16 | do | 2'-methylbenzene-5'-sulfo-N-benzylanilide | Do. |
| 17 | do | 2'-methylbenzene-5'-sulfodiphenylamide | Do. |
| 18 | 1-amino-2.4-dimethoxy-5-benzoylaminobenzene | 2'-methylbenzene-5'-sulfodiethylamide | Violet. |

| | | Dyestuff from— | | |
|---|---|---|---|---|
| | | Diazo compound of— | Coupled with— | Shade |
| | | | *2.3-hydroxynaphthoyl-1'-amino-* | |
| | 19 | 1-amino-2-methoxy-4-acetaminobenzene | 2'-methoxybenzene-5'-sulfo-N-methylanilide | Violet. |
| | 20 | 1-amino-2.5-diethoxy-4-phenacetylaminobenzene | 2'-methylbenzene-5'-sulfo-N-methylanilide | Blue. |
| | 21 | 1-amino-2.5-diethoxy-4-(2'-naphthoyl)-aminobenzene | 2'-methoxybenzene-5'-sulfo-N-methylanilide | Violet. |
| | 22 | 1-amino-2.5-diethoxy-4-hexahydrobenzoylaminobenzene | 2'-methylbenzene-5'-sulfodiethylamide | Reddish blue |
| | 23 | 1-amino-2.5-diethoxy-4-(4'-chlorobenzoyl)-aminobenzene | 2'-methylbenzene-5'-sulfo-N-methylanilide | Blue. |
| | 24 | 1-amino-2.5-dimethoxy-4-(4'-chlorobenzoyl)-aminobenzene | 2'-methoxybenzene-5'-sulfo-N-methylanilide | Blue. |
| | 25 | 1-amino-2.5-dimethoxy-4-(4'-methoxybenzoyl)-aminobenzene | 2'-methylbenzene-5'-sulfo-N-methylanilide | Reddish blue. |
| | 26 | 1-amino-2-methoxy-5-methyl-4-benzoylaminobenzene | 2'-methylbenzene-5'-sulfo-N-methylanilide | Violet. |
| | 27 | 1-amino-2-methoxy-5-chloro-4-benzoylaminobenzene | 2'-methylbenzene-5'-sulfo-N-methylanilide | Do. |
| | 28 | 1-amino-5-methoxy-4-benzoylaminobenzene | 2'-methylbenzene-5'-sulfodiethylamide | Do. |
| | 29 | 1-amino-2-methyl-5-methoxy-4-benzoylaminobenzene | 2'-methylbenzene-5'-sulfodiethylamide | Do. |
| | 30 | 1-amino-2-chloro-5-methoxy-4-benzoylaminobenzene | 2'-methylbenzene-5'-sulfodiethylamide | Do. |
| | 31 | 1-amino-2.5-diethoxy-4-benzoylaminobenzene | 4'-methylbenzene-5'-sulfo-n-butylamide | Do. |
| | 32 | 1-amino-2.5-dimethoxy-4-benzoylaminobenzene | 4'-methylbenzene-5'-sulfobenzylamide | Blue violet. |
| | 33 | do | 4'-methylbenzene-5'-sulfanilide | Violet. |
| | 34 | do | 4'-methylbenzene-5'-sulfodiethylamide | Blue violet. |
| | 35 | 1-amino-2.5-diethoxy-4-benzoylaminobenzene | 4'-methoxybenzene-5'-sulfodiethylamide | Violet. |
| | 36 | do | 4'-phenoxybenzene-5'-sulfodiethylamide | Do. |
| | 37 | do | 2'.4'-dimethylbenzene-5'-sulfodimethylamide | Blue violet. |
| | 38 | do | 2'-methoxy-4'-chlorobenzene-5'-sulfodimethylamide | Do. |
| | | | *6-bromo-2.3-hydroxy-naphthoyl-1'-amino-* | |
| | 39 | 1-amino-2.5-diethoxy-4-benzoylaminobenzene | 2'-methoxybenzene-5'-sulfodiethylamide | Do. |
| | 40 | do | 2'-methylbenzene-5'-sulfodiethylamide | Reddish blue. |
| | | | *6-methoxy-2.3-hydroxy-naphthoyl-1'-amino-* | |
| | 41 | 1-amino-2-ethoxy-5-benzoylaminobenzene | 2'-methylbenzene-5'-sulfodiethylamide | Violet. |
| | 42 | 1-amino-2-methoxy-4-methyl-5-benzoylaminobenzene | 2'-methoxybenzene-5'-sulfodiethylamide | Do. |
| | 43 | 1-amino-4-methoxy-5-acetaminobenzene | 2'-methylbenzene-5'-sulfodiethylamide | Do. |
| | 44 | 1-amino-2-methyl-4-methoxy-5-benzoyl-aminobenzene | do | Do. |
| | 45 | 1-amino-2-methoxy-4-acetaminobenzene | do | Do. |
| | 46 | 1-amino-2-methoxy-5-methyl-4-benzoyl-aminobenzene | do | Do. |
| | 47 | 1-amino-2-chloro-5-methoxy-4-benzoyl-aminobenzene | do | Blue. |
| | 48 | 1-amino-2.5-diethoxy-4-benzoylaminobenzene | 2'-methoxybenzene-5'-sulfodiethylamide | Blue violet. |
| | 49 | 1-amino-2.5-diethoxy-4-benzoylaminobenzene | 2'-methylbenzene-5'-sulfodiethylamide | Blue. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble mono-azodyestuffs of the following general formula:

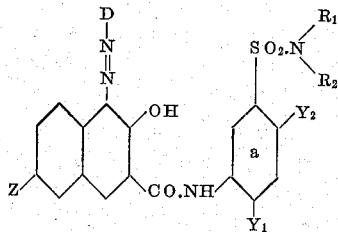

wherein the benzene radical $a$ is substituted in at least one of the two positions $Y_1$ and $Y_2$ by a member of the group consisting of alkyl, alkoxy, phenoxy and halogen, $R_1$ and $R_2$ stand for members of the group consisting of hydrogen, alkyl, aryl, benzyl and hydroaromatic radicals and the diazo radical D stands for compounds of the following formula:

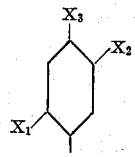

wherein $X_1$ stands for a member of the group consisting of hydrogen, alkyl, alkoxy and halogen, $X_2$ and $X_3$ stand for members of the group consisting of hydrogen, alkyl, alkoxy, halogen and the group —NH.CO.$R_3$, $R_3$ being a member of the group consisting of alkyl, benzyl, a radical of the benzene and naphthalene series and a hydroaromatic radical, always one of the three substituents $X_1$, $X_2$ and $X_3$ being an alkoxy group and always one of the two substituents $X_2$ and $X_3$ being the group —NH.CO.$R_3$, wherein Z stands for a member of the group consisting of hydrogen, halogen and alkoxy, Z being alkoxy in case $X_2$ stands for the group —NH.CO.$R_3$ and one of the substituents $X_1$ and $X_3$ for a member of the group consisting of hydrogen and halogen, yielding fast violet to blue lakes and, when mixed with rubber products, violet to blue colorations of very good fastness to light and to vulcanization.

2. The water-insoluble mono-azodyestuffs of the following general formula:

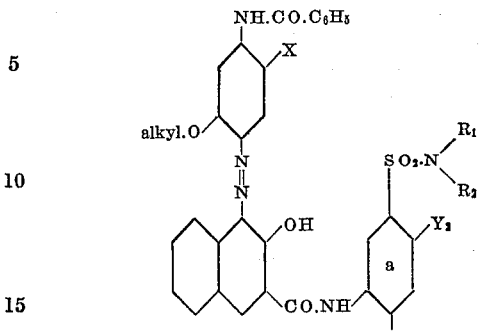

wherein the benzene radical $a$ is substituted in at least one of the two positions $Y_1$ and $Y_2$ by a member of the group consisting of alkyl, alkoxy, phenoxy and halogen, $R_1$ and $R_2$ stand for members of the group consisting of hydrogen, alkyl, aryl, benzyl and hydroaromatic radicals and X stands for a member of the group consisting of hydrogen, alkyl, alkoxy and halogen, yielding fast violet to blue lakes and, when mixed with rubber products, voilet to blue colorations of very good fastness to light and to vulcanization.

3. The water-insoluble mono-azodyestuff of the following formula:

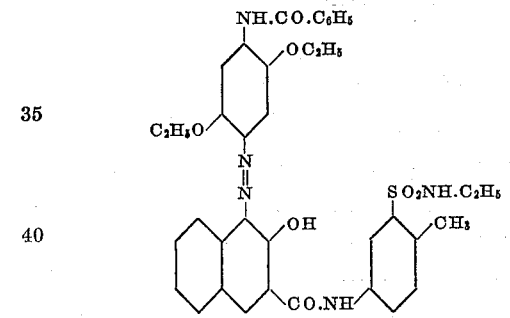

yielding fast bluish violet lakes and, when mixed with rubber products, bluish violet colorations of very good fastness to light and to vulcanization.

4. The water-insoluble mono-azodyestuff of the following formula:

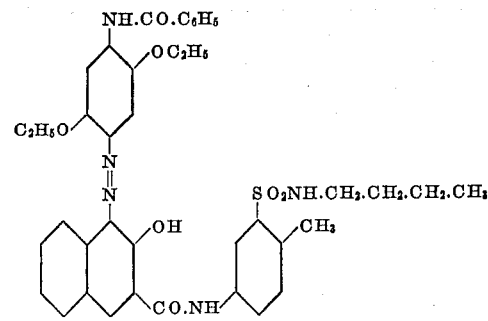

yielding fast violet lakes and, when mixed with rubber products, voilet colorations of very good fastness to light and to vulcanization.

5. The water-insoluble mono-azodyestuff of the following formula:

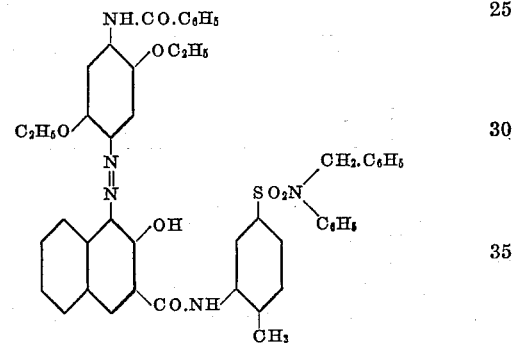

yielding fast blue lakes and, when mixed with rubber products, blue colorations of very good fastness to light and to vulcanization.

ERNST FISCHER.